United States Patent
Hsieh et al.

(10) Patent No.: US 8,256,813 B2
(45) Date of Patent: Sep. 4, 2012

(54) SUCTION HEAD AND TRANSPORTING MACHINE APPLYING THE SAME

(75) Inventors: Jung-Lin Hsieh, Kaohsiung (TW);
Shang-Chih Chen, Kaohsiung (TW);
Hung-Tsung Chung, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 161 days.

(21) Appl. No.: 12/722,777

(22) Filed: Mar. 12, 2010

(65) Prior Publication Data
US 2011/0176900 A1 Jul. 21, 2011

(30) Foreign Application Priority Data
Jan. 15, 2010 (TW) ................. 99101112 A

(51) Int. Cl.
*B25J 15/06* (2006.01)
*B25J 11/00* (2006.01)
*B66C 1/02* (2006.01)
(52) U.S. Cl. .............. 294/183; 294/65; 901/40
(58) Field of Classification Search .......... 294/183, 294/65, 186, 188, 189; 29/740; 901/40; 269/21; 414/737, 752.1
See application file for complete search history.

(56) References Cited

U.S. PATENT DOCUMENTS

| | | | |
|---|---|---|---|
| 2,557,260 A * | 6/1951 | Clark | 294/183 |
| 4,979,286 A * | 12/1990 | Nakayama et al. | 294/183 |
| 6,184,074 B1 * | 2/2001 | Crenshaw et al. | 438/238 |
| 6,240,628 B1 * | 6/2001 | Yoshida et al. | 29/740 |
| 6,485,009 B2 * | 11/2002 | Kashiwazaki et al. | 294/183 |
| 6,663,092 B2 * | 12/2003 | Kashiwazaki et al. | 269/21 |
| 6,820,325 B2 * | 11/2004 | Gieskes et al. | 294/183 |

* cited by examiner

*Primary Examiner* — Paul T Chin
(74) *Attorney, Agent, or Firm* — J.C. Patents

(57) ABSTRACT

A suction head including a first transmission part, a second transmission part and a suction nozzle is provided. The second transmission part is magnetically attracted by the first transmission part to permit a displacement of the second transmission part relative to the first transmission part. The suction nozzle is disposed on the second transmission part and transmitted by the first transmission part via the second transmission part. Additionally, a transporting machine including a shuttle, a transporting mechanism and the aforementioned suction nozzle is provided. The shuttle is capable of carrying an object being transported, and the suction head is driven by the transporting mechanism to take the object being transported. The suction head and the transporting machine applying the same provide high transporting efficiency and ensuring a normal operation in transporting process.

19 Claims, 6 Drawing Sheets

SUCTION HEAD AND TRANSPORTING MACHINE APPLYING THE SAME

CROSS-REFERENCE TO RELATED APPLICATION

This application claims the priority benefit of Taiwan application serial no. 99101112, filed on Jan. 15, 2010. The entirety of the above-mentioned patent application is hereby incorporated by reference herein and made a part of this specification.

BACKGROUND OF THE INVENTION

1. Field of the Invention

The present invention relates to a suction head and a transporting machine applying the same. More particularly, the present applicant relates to a suction head and a transporting machine of a package process.

2. Description of Related Art

In a conventional semiconductor package process, wafers, finished products or semi-finished products are transported among different process stops by an automatic transporting machine. In which, a manual adjustment to a suction head of the transporting machine is required in the transporting process of a conventional transporting machine.

However, the manual adjustment accompanies with inaccuracy and errors due to human effects, such that the transporting machine may fail to retrieve objects or the suction head and the mechanical arms of the transporting machine may strike external objects and get damaged. On the other hand, the manual adjustment wastes working-hours, requires high productive cost, and thus reduces the product efficiency.

SUMMARY OF THE INVENTION

The present application provides a suction head capable of buffering position deviation and a transporting machine applying the suction head, so as to improve high transporting efficiency and ensuring a normal operation in transporting process.

As embodied and broadly described herein, a suction head including a first transmission part, a second transmission part and a suction nozzle is provided. The second transmission part is magnetically attracted by the first transmission part to permit a displacement of the second transmission part relative to the first transmission part. The suction nozzle is disposed on the second transmission part and transmitted by the first transmission part via the second transmission part.

Additionally, a transporting machine including a shuttle, a transporting mechanism and the aforementioned suction nozzle is provided. The shuttle is capable of carrying an object being transported, and the suction head is driven by the transporting mechanism to take the object being transported.

In an embodiment of the present application, the suction head further comprises a partition plate disposed at an attraction interface between the first transmission part and the second transmission part.

In an embodiment of the present application, the first transmission part includes a first transmission shaft and a first magnet disposed at an end of the first transmission shaft and attracting the second transmission part.

In an embodiment of the present application, the second transmission part includes a second transmission shaft and a second magnet disposed at an end of the second transmission shaft and attracting the first transmission part.

In an embodiment of the present application, the second transmission part further comprises a joint communicating with the suction nozzle, and the joint is connected to a vacuum pump to generate a vacuum attraction force.

In an embodiment of the present application, the suction head further comprises a guider having an outline complying with the shuttle.

In an embodiment of the present application, the guider is provided with an outer inclined plane. In addition, the outer inclined plane of the guider complies with a cavity of the shuttle, the cavity accommodating the transported object.

In an embodiment of the present application, the guider is provided with an inner inclined plane surrounding the suction nozzle and leaning against the object attracted by the suction nozzle.

In an embodiment of the present application, the guider is provided with at least a through hole having a profile complying with a guide pin on the shuttle.

In an embodiment of the present application, the suction nozzle is retractable.

The present application further comprises a suction head including a first transmission shaft, a first magnet, a second transmission shaft, a second magnet, a horizontal partition plate, a retractable suction nozzle, a joint and a guider. The first transmission shaft is provided with a first vertical longitudinal axis, and the first magnet is disposed at an end of the first transmission shaft. The second transmission shaft is provided with a second vertical longitudinal axis, and the second magnet is disposed at an end of the second transmission shaft. The horizontal partition plate is disposed between the first magnet and the second magnet, wherein the first magnet and the second magnet are attracted to each other with the horizontal partition plate therebetween, to permit a displacement of the second magnet relative to the first magnet. The retractable suction nozzle is disposed at another end of the second transmission shaft and transmitted by the first transmission shaft via the second transmission shaft. The joint is disposed on the second transmission shaft and communicating with the suction nozzle. The guider has an outline complying with a shuttle carrying an object being transported.

As to the above, the suction head of the present application includes a first transmission part and a second transmission part magnetically attracted together to permit a displacement of the second transmission part relative to the first transmission part, by which position deviation of the suction head during process can be eliminated and the damage caused by impact between the suction head and the external object can be prevented. In addition, the guider disposed on the second transmission part accomplishes self-adjustment to the position deviation of the suction head in process, so as to precisely retrieve or place the transported object and the position of the suction head can be automatically adjusted without spending additional working-hour. Besides, a partition plate is disposed at an attraction interface between the first transmission part and the second transmission part to permit a displacement of the second transmission part relative to the first transmission part. The suction head and the transporting machine applying the same provide high transporting efficiency and ensuring a normal operation in transporting process.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
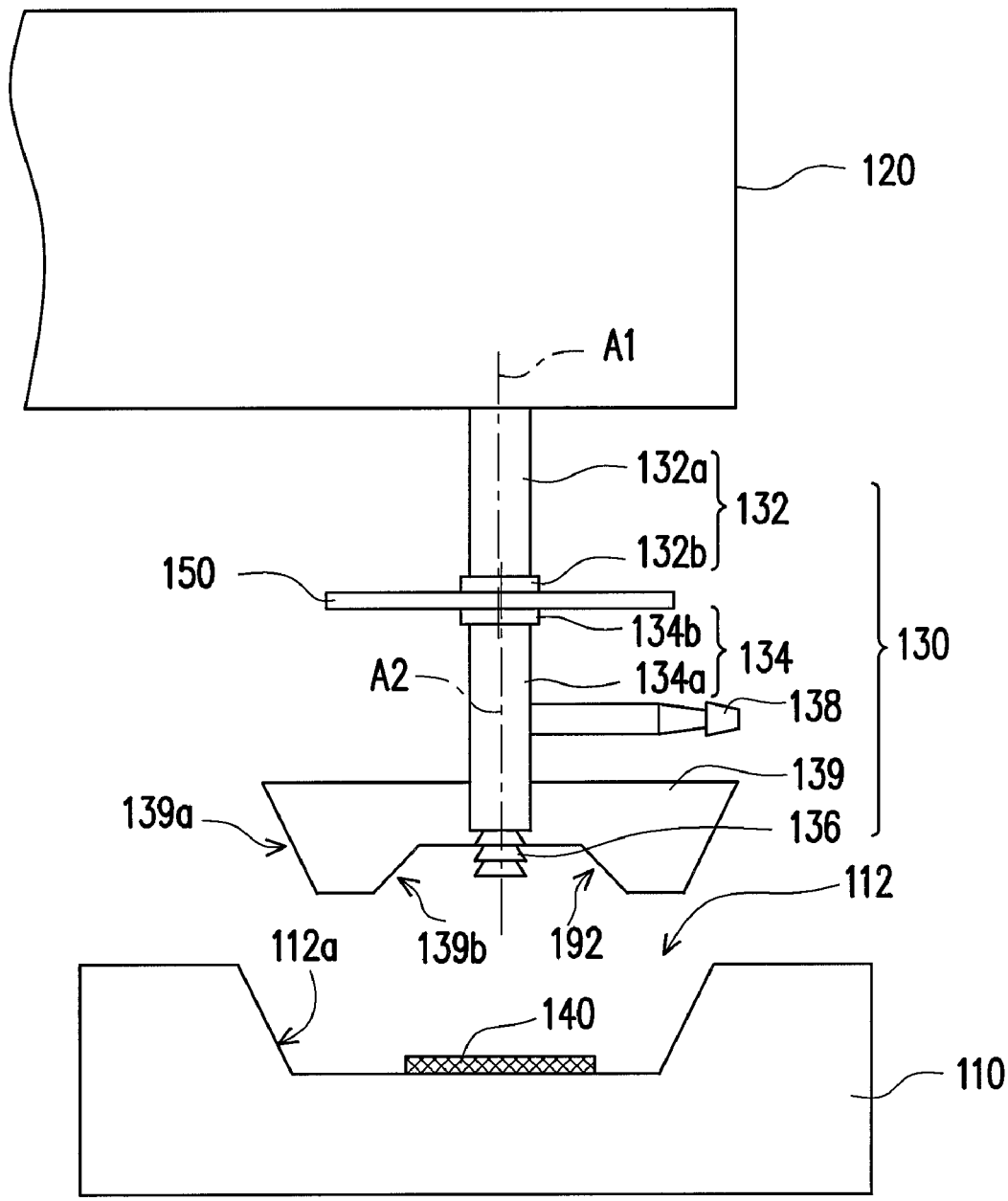
FIG. 1 is a schematic view of a transporting machine according to an embodiment of the present application.

FIG. 1 is a schematic view of a transporting machine according to an embodiment of the present application. Referring to FIG. 1, a transporting machine 100 includes a shuttle 110, a transporting mechanism 120 and an aforementioned suction head 130, wherein the shuttle 110 is used to carry a transported object 140, such as wafers, finished products or semi-finished products. The shuttle 110 has a cavity 112 accommodating the transported object 140. In the present embodiment, the transported object 140 is, for example, a material to be transported or a material transported to a specific position. In other words, the shuttle 110 can be used for retrieving material or placing material. The transporting mechanism 120 is, for example, a robot or other driving mechanisms capable of providing two-dimensional or three-dimensional movement. The transporting mechanism 120 is connected between a power source (e.g. a servomotor) and the suction head 130 of the transporting machine 100 to drive the suction head 130 performing the two-dimensional or three-dimensional movement. The suction head 130 includes a first transmission part 132, a second transmission part 134 and a suction nozzle 136. The first transmission part 132 is connected to the transporting mechanism 120, while the second transmission part 134 is magnetically attracted by the first transmission part 132 to permit a displacement of the second transmission part 134 relative to the first transmission part 132. In addition, the suction nozzle 136 is disposed on an end of the second transmission part 134. Accordingly, the transporting mechanism 120 can drive the suction nozzle 136 moving via the first transmission part 132 and the second transmission part 134. Herein, the suction nozzle 136 is, for example, a retractable suction nozzle 136, to provide a buffer in height such that the suction nozzle 136 retrieves the transported object 140 reliably.

In the embodiment, since the first transmission part 132 and the second transmission part 134 are coupled with each other via magnetic force, the second transmission part 134 together with the suction nozzle 136 can depart from the first transmission part 132 as the suction head 130 strikes external object due to deviation of position or other reasons, so as to prevent damage of components caused by impact between the suction head 130 and the external object. Besides, since there permits a relative displacement between the first transmission part 132 and the second transmission part 134, the deviation of position can be immediately adjusted in process by a manual manner or a guider to correct the positions of the second transmission part 134 and the suction nozzle 136.

Referring to FIG. 1, to facilitate the relative displacement between the first transmission part 132 and the second transmission part 134, a partition plate 150 can further be disposed at an attraction interface between the first transmission part 132 and the second transmission part 134. The partition plate 150 is, for example, a smooth flat plate, wherein the first transmission part 132 and the second transmission part 134 are disposed at two opposite sides of the partition plate 150 and move with respect to each other by the magnetic force therebetween.

In this embodiment, the first transmission part 132 is embodied as a first transmission shaft 132a and a first magnet 132b disposed at an end of the first transmission shaft 132a and attracting the second transmission part 134. The first magnet 132b is, for example, a permanent magnet or a soft magnet.

Similarly, the second transmission part 134 is embodied as a second transmission shaft 134a and a second magnet 134b disposed at an end of the second transmission shaft 134a adjacent to the first transmission part 132 and the second magnet 134b attracting the first transmission part 132. In other words, the first magnet 132b and the second magnet 134b are attracted with each other, to locate the position of the first transmission shaft 132a relative to the second transmission shaft 134a. Like the first magnet 132b, the second magnet 132b is, for example, a permanent magnet or a soft magnet.

Besides, other embodiments of the present application may adopt different designs to achieve equivalent or like magnetic attracting effect. The first transmission shaft 132a or the second transmission shaft 134a can be made of permanent magnetic material or soft magnetic material. For example, both the first transmission shaft 132a and the second transmission shaft 134a are permanent magnets; or, the first transmission shaft 132a is a permanent magnet and the second transmission shaft 134a is a soft magnet; or instead, the first transmission shaft 132a is a soft magnet and the second transmission shaft 134a is a permanent magnet. Therefore, at least one of the first magnet 132b or the second magnet 134b can be omitted to reduce manufacturing cost and simplify the structure of the suction head 130.

Further referring to FIG. 1, a joint 138 communicates with the suction nozzle 136 is disposed on the second transmission shaft 134a to drive the suction nozzle 136. The joint 138 can be connected to a vacuum source such as a vacuum pump, so as to drive the suction nozzle 136 generating a suction force and retrieving the transported object 140.

In addition, a guider can be disposed on the suction head 130 of the transporting machine 100 to accomplish a self-adjustment to the position deviation of the suction head 130, and thus the transported object 140 can be precisely retrieved and the position of the suction head 130 can be automatically adjusted without spending additional working-hour.

In the present embodiment, the guider for the suction head 130 is, for example, a guide block 139 disposed on the second transmission shaft 134a, the guide block 139 having an outline complying with the cavity 112 of the shuttle 110. More specifically, the guide block 139 has an outer inclined plane 139a adapted to lean against a inner wall 112a of the cavity 112 of the shuttle 110. Accordingly, when the second transmission shaft 134a drives the suction nozzle 136 entering the cavity 112 and retrieving or placing the transported object 140, the outer inclined plane 139a leans against the inner wall 112a of the cavity 112 and thereby guides the second transmission shaft 134a and the suction nozzle 136 to enter the cavity 112 and retrieve or place the transported object 140.

Hence, correlation between the guide block 139 and the cavity 112 helps to drive the second transmission shaft 134a and the suction nozzle 136 moving relative to the first transmission shaft 132a and adjust the position of the second transmission shaft 134a and the suction nozzle 136 even if a position deviation of the suction head 130 occurs, and the second transmission shaft 134a and the suction nozzle 136 are not located immediately over the transported object 140.

At this time, although a first vertical longitudinal axis A1 of the first transmission shaft 132a and a second vertical longitudinal axis A2 of the second transmission shaft 134a are not in coincidence, the first transmission shaft 132a and the second transmission shaft 134a are kept attracting with each other by the first magnet 132b and the second magnet 134b. Furthermore, whether the first transmission part 132 moves relative to the second transmission part 134 or not, the suction nozzle 136 is always kept on the same horizontal plane.

In addition, the guide block 139 may further be provided with an inner inclined plane 139b surrounding the suction nozzle 136 and leaning against the transported object 140 attracted by the suction nozzle 136. More specifically, the guide block 139 has, for example, a cavity 192 corresponding to the suction nozzle 136, and the inner wall of the cavity 192 serves as the inner inclined plane 139b. Even if the suction nozzle 136 and the transported object 140 are not aligned, the transported object 140 moves along the inner inclined plane 139b in the process of retrieving the transported object 140 and finally reaches a determined position.

Surely, the above guide block 139 is merely an embodiment of the guider, which provides no limitation to the types of guider of the present application. Guiders or structural designs capable of achieving equivalent or similar effect as that of the guide block 139 of the above embodiment can also be applied to the suction head and the transporting machine of the present invention. In an embodiment of the present application, the guider is provided with an outer inclined plane.

Figure 2:
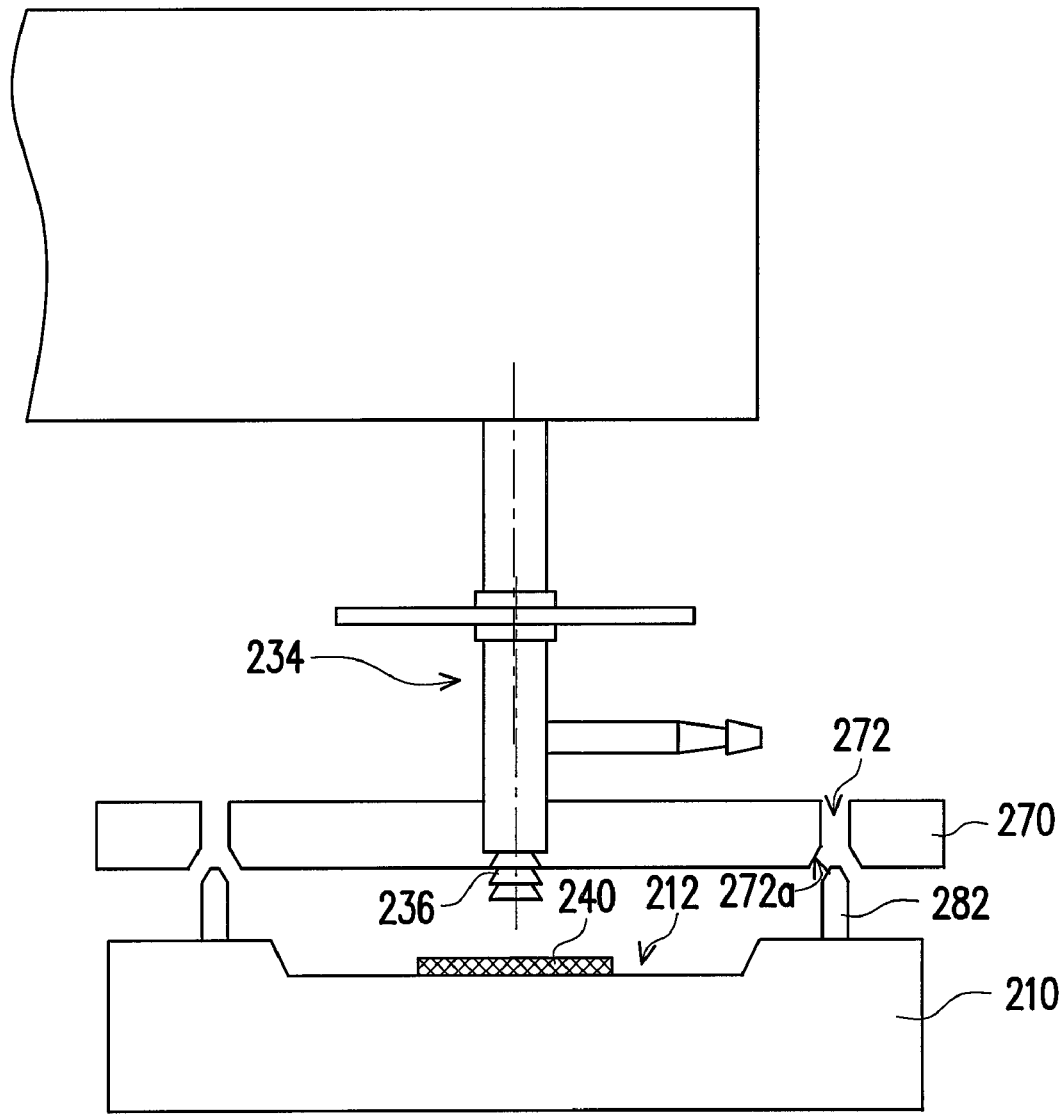
FIG. 2 is a schematic view of a transporting machine according to another embodiment of the present application.

FIG. 2 is a schematic view of a transporting machine according to another embodiment of the present application. The transporting machine 200 of the present embodiment is similar to the transporting machine 100 of the above embodiment except that their guiders are different. Referring to FIG. 2, the guider of this embodiment is, for example, a guide block 270 disposed on the second transmission part 234, and the guide block 270 has at least one through hole 272 (FIG. 2 shows two through holes 272). In addition, at least one guide pin 282 is disposed on the shuttle 210 (FIG. 2 shows two guide pins 282), wherein the through holes 272 have a profile complying with the corresponding guide pins 282.

Accordingly, when the second transmission shaft 134a drives the suction nozzle 236 entering the cavity 210 and retrieving or placing the transported object 240, the guide pins 282 on the shuttle 210 enters the corresponding through holes 272 of the guide block 270, thereby guides the second transmission shaft 134a and the suction nozzle 236 to enter the cavity 212 and retrieve or place the transported object 210. Additionally, an end of each of the through holes 272 adjacent to the corresponding guide pin 282 is enlarged to form an inclined plane 272a to facilitate the guide pin 282 entering the through hole 272.

FIGS. 3A through 3D sequentially illustrate placing a transported object to a shuttle by the transporting machine of FIG. 1.

Figure 3A:
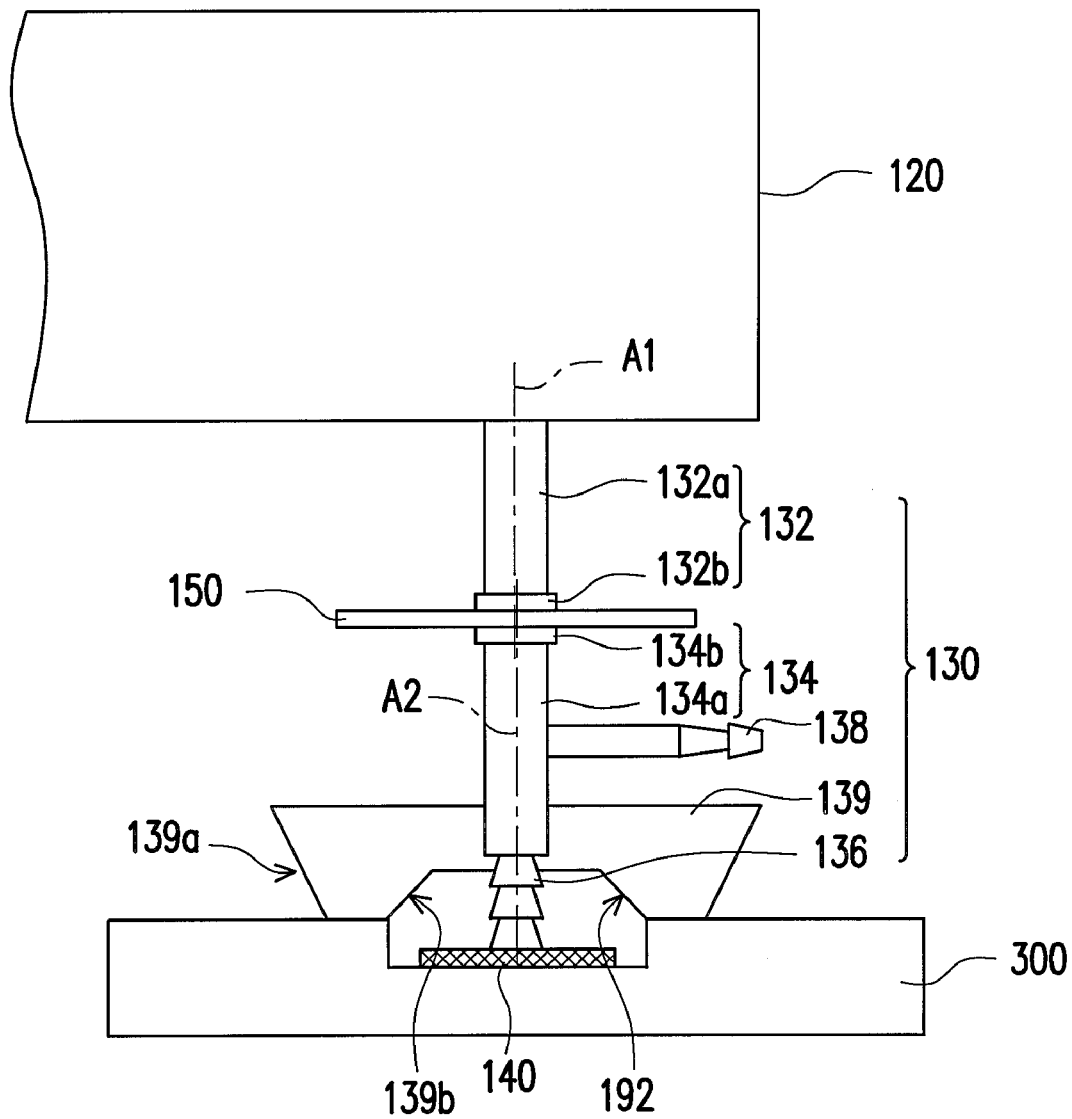
FIGS. 3A through 3D sequentially illustrate placing a transported object to a shuttle by the transporting machine of FIG. 1.

Firstly, referring to FIG. 3A, the transporting machine 100 retrieves the transported object 140 from a tray 300, wherein the transported object 140 is, for example, finished package products, semi-finished package products or other objects. The suction nozzle 136 is, for example, a retractable suction nozzle 136, to provide a buffer in height such that the suction nozzle 136 retrieves the transported object 140 reliably.

Figure 3B:
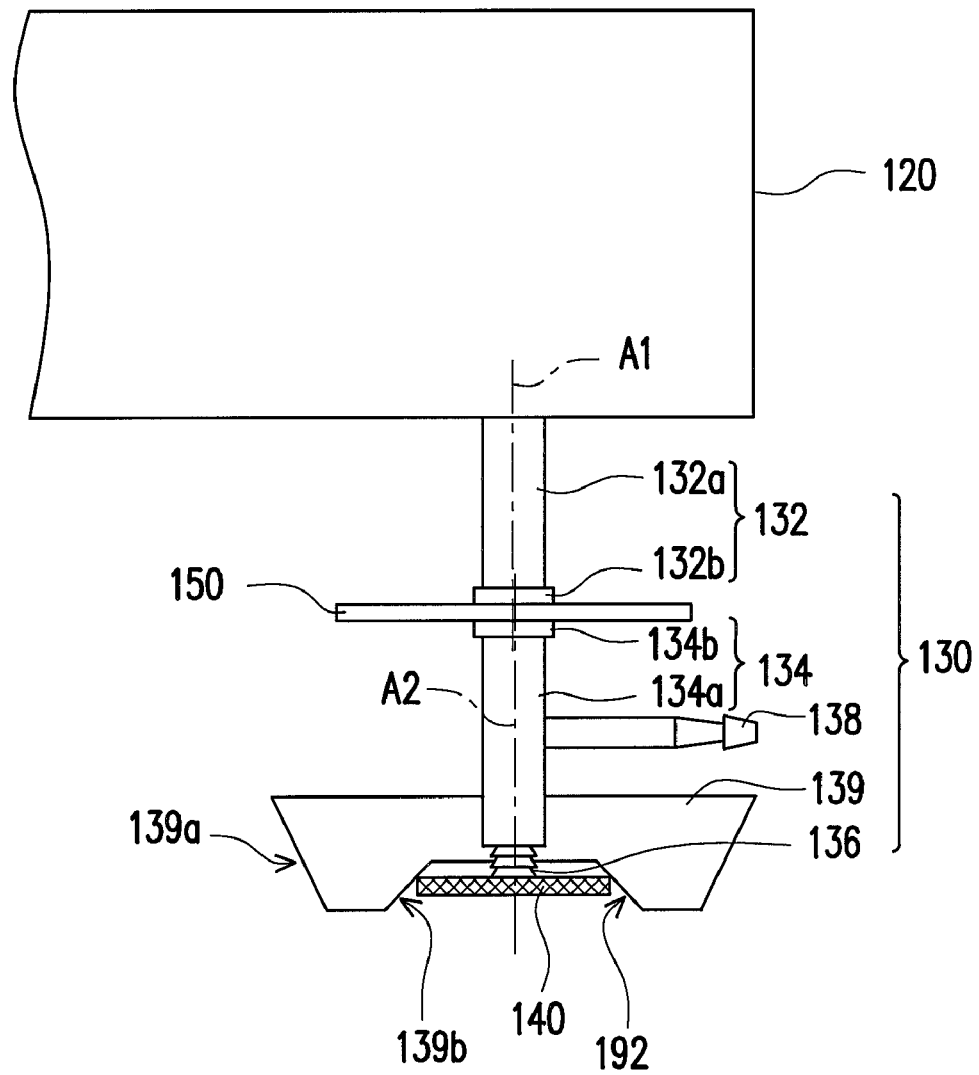

Then, referring to FIG. 3B, the suction nozzle 136 generates a suction force by connecting the joint 138 to a vacuum source so as to retrieving the transported object 140. Herein, the transported object 140 enters the cavity 192 of the guide block 139 and is driven by the transporting mechanism 120 and the suction head 130. Since the cavity 192 of the guide block 139 has the inner inclined plane 139b, even if the suction nozzle 136 and the transported object 140 are not aligned, the transported object 140 can move along the inner inclined plane 139b in the process of retrieving the transported object 140 and finally reaches a determined position.

Figure 3C:
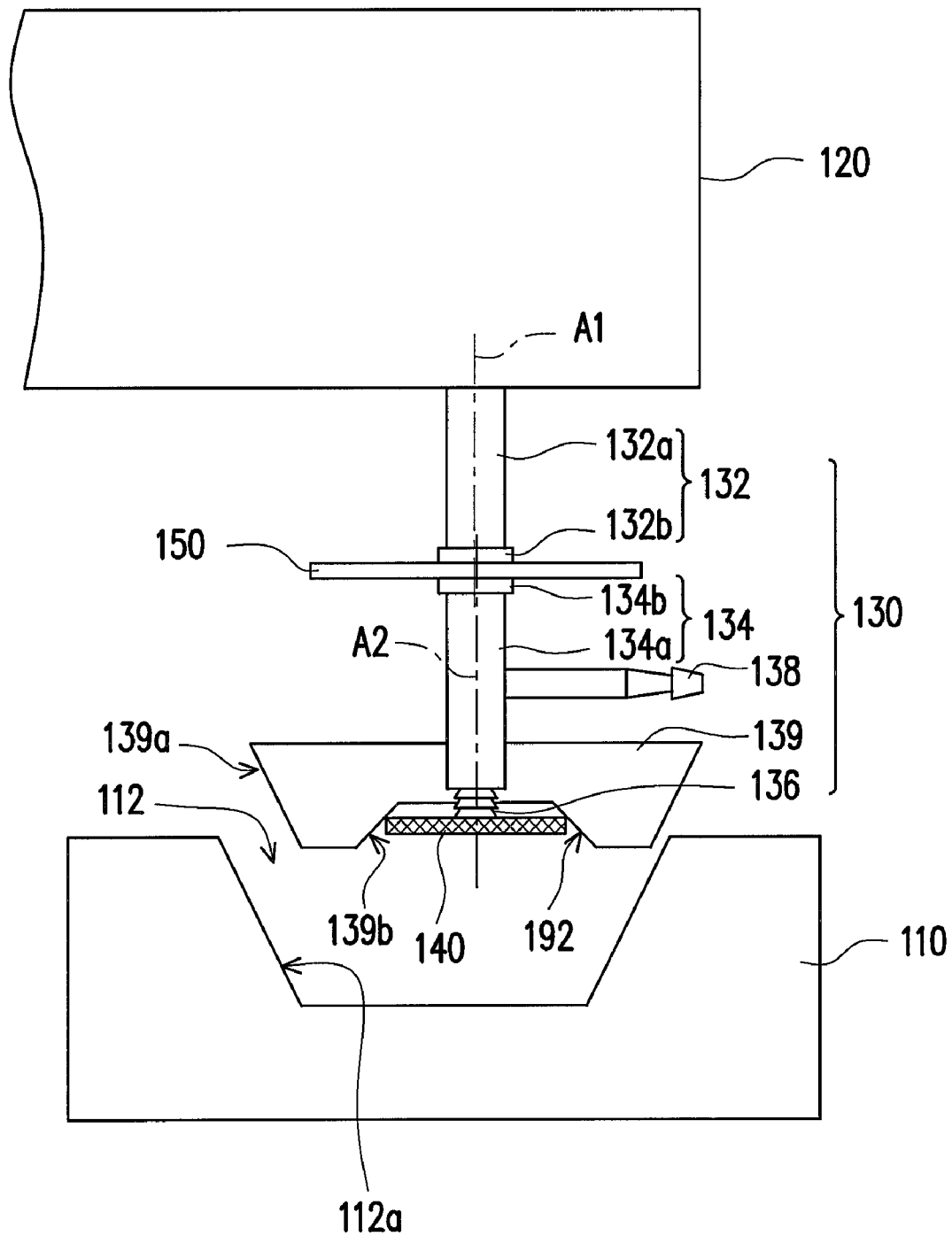

After that, as shown in FIG. 3C, the transporting mechanism 120 and the suction head 130 move the transported object 140 to the location immediately over the shuttle 110. Herein, the transporting mechanism 120 and the suction head 130 may have derivation in position, and thus the transported object 140 is not located immediately over the cavity 112 of the shuttle 110. At this time, the first vertical longitudinal axis A1 of the first transmission shaft 132a and the second vertical longitudinal axis A2 of the second transmission shaft 134a are in coincidence but not aligned with a center of the cavity 112.

Figure 3D:
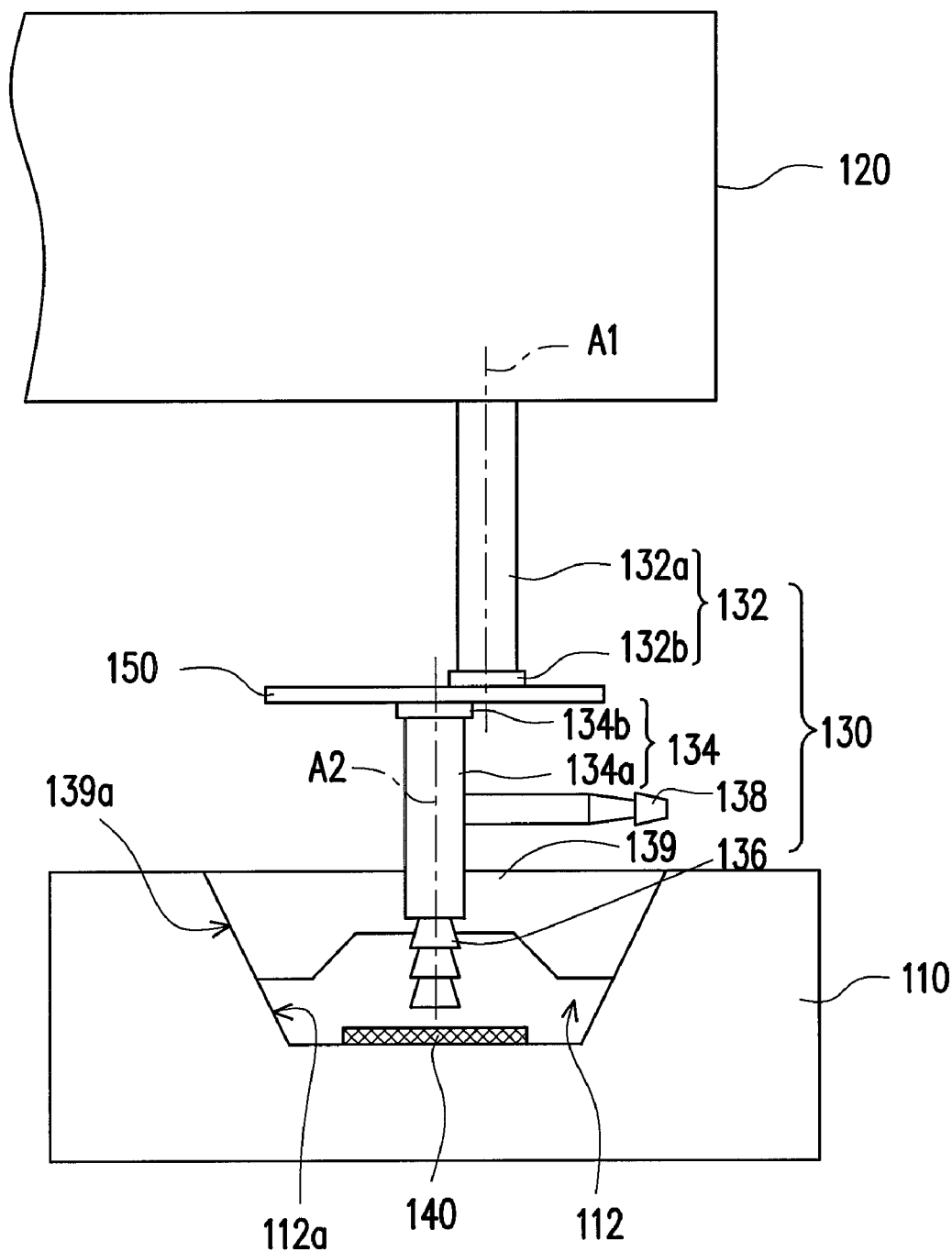

Then, referring to FIG. 3D, the transporting mechanism 120 drives the suction head 130 moving downward, such that the guide block 139 of the suction head 130 enters the cavity 112 of the shuttle 110 having the profile complying with the guide block 139. Herein, the outer inclined plane 139a of the guide block 139 leans against the inner wall 112a of the cavity, so as to guide the second transmission shaft 134a and the second magnet 14b moving relative to the first transmission shaft 132a and the first magnet 132b with the horizontal partition plate 150 therebetween, and then the second vertical longitudinal axis A2 of the second transmission shaft 134a and the suction nozzle 136 can be aligned with the center of the cavity 112. In addition, the vacuum source connected to the joint 138 is not work to release the transported object 140 and placing the transported object 140 into the cavity 112. At this time, although a first vertical longitudinal axis A1 of the first transmission shaft 132a and a second vertical longitudinal axis A2 of the second transmission shaft 134a are not in coincidence, the first transmission shaft 132a and the second transmission shaft 134a are kept attracting with each other by the first magnet 132b and the second magnet 134b.

Besides, after retrieving or placing the transported object 140 and driving the suction head 130 departing from the cavity 112, the second transmission shaft 134a and the second magnet 134b are drawn back to the original position as shown in FIG. 3C by the magnetic attraction force between the first magnet 132b and the second magnet 134b, and then the first vertical longitudinal axis A1 of the first transmission shaft 132a and the second vertical longitudinal axis A2 of the second transmission shaft 134a are in coincidence. Furthermore, whether the first transmission part 132 moves relative to the second transmission part 134 or not, the suction nozzle 136 is always kept on the same horizontal plane.

The process of placing the transported object 140 to the shuttle 110 by the transporting machine 100 of FIG. 1 is substantially completed. On the other hand, steps shown in FIGS. 3A through 3D can further be reversely performed to retrieve the transported object 140 from the shuttle 110 by the transporting machine 100 of FIG. 1. Steps of the reversed process are not repeated herein. Furthermore, the suctions as illustrated in FIG. 2 or other embodiments of the present application can also applied to the transporting process of FIGS. 3A through 3D, to achieve equivalent or like effects.

Different from the conventional design fixing the suction nozzle on the transporting machine, the suction head of the present application is separated into a first transmission part and a second transmission part magnetically attracted together to permit a displacement of the second transmission part relative to the first transmission part, by which position deviation of the suction head during process can be eliminated and the damage caused by impact between the suction head and the external object can be prevented. Besides, a partition plate is disposed at an attraction interface between the first transmission part and the second transmission part to facilitate the second transmission part moving relative to the first transmission part. Since the first transmission part and the second transmission part are coupled with each other via magnetic force, the second transmission part together with the suction nozzle can depart from the first transmission part as the suction head strikes an external object due to deviation of position or other reasons, so as to prevent damage of components caused by impact between the suction head and the external object. Besides, since there permits a relative displacement between the first transmission part and the second transmission part, the deviation of position can be immediately adjusted in process by a manual manner or a guider to correct the positions of the second transmission part and the suction nozzle. More particularly, the guider disposed on the second transmission part accomplishes self-adjustment to the position deviation of the suction head in process, so as to precisely retrieve or place the transported object and the position of the suction head can be automatically adjusted without spending additional working-hour. Therefore, the suction head and the transporting machine applying the same provide high transporting efficiency and ensuring a normal operation in transporting process.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A suction head, comprising:
   a first transmission part;
   a second transmission part, magnetically attracted by the first transmission part to permit a displacement of the second transmission part relative to the first transmission part;
   a partition plate disposed at an attraction interface between the first transmission part and the second transmission part; and
   a suction nozzle, disposed on the second transmission part and transmitted by the first transmission part via the second transmission part.

2. The suction head as claimed in claim 1, wherein the first transmission part comprises:
   a first transmission shaft; and
   a first magnet disposed at an end of the first transmission shaft and attracting the second transmission part.

3. The suction head as claimed in claim 1, wherein the second transmission part comprises:
   a second transmission shaft; and
   a second magnet disposed at an end of the second transmission shaft and attracting the first transmission part.

4. The suction head as claimed in claim 3, wherein the second transmission part further comprises a joint communicating with the suction nozzle.

5. The suction head as claimed in claim 1, further comprising a guider having an outline complying with a shuttle carrying an object being transported.

6. The suction head as claimed in claim 5, wherein the guider is provided with an outer inclined plane complying with a cavity of the shuttle, the cavity accommodating the transported object.

7. The suction head as claimed in claim 5, wherein the guider is provided with an inner inclined plane surrounding the suction nozzle and leaning against the object attracted by the suction nozzle.

8. The suction head as claimed in claim 5, wherein the guider is provided with at least a through hole having a profile complying with a guide pin on the shuttle.

9. The suction head as claimed in claim 1, wherein the suction nozzle is retractable.

10. A transporting machine, comprising:
    a shuttle carrying an object being transported;
    a transporting mechanism;
    a suction head driven by the transporting mechanism, the suction head comprising:
    a first transmission part connected to the transporting mechanism;
    a second transmission part, magnetically attracted by the first transmission part to permit a displacement of the second transmission part relative to the first transmission part;
    a partition plate disposed at an attraction interface between the first transmission part and the second transmission part; and
    a suction nozzle, disposed on the second transmission part and transmitted by the first transmission part via the second transmission part.

11. The transporting machine as claimed in claim 10, wherein the first transmission part comprises:
    a first transmission shaft; and
    a first magnet disposed at an end of the first transmission shaft and attracting the second transmission part.

12. The transporting machine as claimed in claim 10, wherein the second transmission part comprises:
    a second transmission shaft; and
    a second magnet disposed at an end of the second transmission shaft and attracting the first transmission part.

13. The transporting machine as claimed in claim 12, wherein the second transmission part further comprises a joint communicating with the suction nozzle.

14. The transporting machine as claimed in claim 10, wherein the suction head further comprises a guider having an outline complying with the shuttle.

15. The transporting machine as claimed in claim 14, wherein the guider is provided with an outer inclined plane complying with a cavity of the shuttle, the cavity accommodating the transported object.

16. The transporting machine as claimed in claim 14, wherein the guider is provided with an inner inclined plane surrounding the suction nozzle and leaning against the object attracted by the suction nozzle.

17. The transporting machine as claimed in claim 14, wherein the guider is provided with at least a through hole having a profile complying with a guide pin on the shuttle.

18. The transporting machine as claimed in claim 10, wherein the suction nozzle is retractable.

19. A suction head, comprising:
    a first transmission shaft having a first vertical longitudinal axis;
    a first magnet disposed at an end of the first transmission shaft;
    a second transmission shaft having a second vertical longitudinal axis;
    a second magnet disposed at an end of the second transmission shaft;
    a horizontal partition plate disposed between the first magnet and the second magnet, wherein the first magnet and the second magnet are attracted to each other with the horizontal partition plate therebetween, to permit a displacement of the second magnet relative to the first magnet;

a retractable suction nozzle disposed at another end of the second transmission shaft and transmitted by the first transmission shaft via the second transmission shaft;

a joint disposed on the second transmission shaft and communicating with the suction nozzle; and a guider having an outline complying with a shuttle carrying an object being transported.

* * * * *